United States Patent
Lazzaro et al.

(10) Patent No.: US 9,654,470 B2
(45) Date of Patent: May 16, 2017

(54) MULTI-FUNCTION SMART COMMUNICATION CARD

(71) Applicant: The United States of America, as represented by the Secretary of the Army, Washington, DC (US)

(72) Inventors: Matthew Lazzaro, Churchville, MD (US); Stanley Fong, Hazlet, NJ (US); Todd Lutton, New Windsor, MD (US); Uday Shenvi, Columbia, MD (US); Ghanshyam Dave, Marlton, NJ (US); William Toth, Ocean, NJ (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 14/870,099

(22) Filed: Sep. 30, 2015

(65) Prior Publication Data
US 2016/0021107 A1    Jan. 21, 2016

Related U.S. Application Data

(63) Continuation of application No. 14/330,051, filed on Jul. 14, 2014, now Pat. No. 9,177,133.

(51) Int. Cl.
| | | |
|---|---|---|
| *G06K 19/06* | (2006.01) | |
| *H04L 29/06* | (2006.01) | |
| *G06F 21/32* | (2013.01) | |
| *G06F 21/34* | (2013.01) | |
| *G06K 19/07* | (2006.01) | |
| *G06F 21/81* | (2013.01) | |

(52) U.S. Cl.
CPC .......... *H04L 63/0861* (2013.01); *G06F 21/32* (2013.01); *G06F 21/34* (2013.01); *G06F 21/81* (2013.01); *G06K 19/0701* (2013.01); *G06K 19/0707* (2013.01); *G06K 19/0718* (2013.01); *H04L 63/0853* (2013.01)

(58) Field of Classification Search
CPC ...... G07F 7/1008; G07F 7/086; G07F 7/0886; G06Q 20/341; G06Q 20/40145; G06Q 20/10; G06Q 20/3415; G06Q 20/385; G06Q 20/4097; G06Q 20/04; G06Q 20/065; G06Q 20/16; G06Q 20/3227; G06Q 20/327
USPC ................. 235/492, 486, 487, 375
See application file for complete search history.

(56) References Cited

U.S. PATENT DOCUMENTS

| 4,812,634 | A | * | 3/1989 | Ohta ...................... G06K 19/07 235/487 |
| 5,058,075 | A | * | 10/1991 | Mizuta ................... G11C 5/141 307/64 |

(Continued)

*Primary Examiner* — Thien M Le
(74) *Attorney, Agent, or Firm* — Ronald Krosky; Azza Jayaprakash

(57) ABSTRACT

Various embodiments are described that relate to a smart card. When not connected to an external system, such as a laptop computer, the smart card can be configured to power itself. Thus, various functions can be practiced on the smart card in absence of connection to the external system. Example functions of the smart card can include user identification and authorization. In addition, the smart card can be configured to distinguish between different users and provide different access levels to different users and/or difference access to containers resident within the smart card. This can be done prior to when the smart card is connected to the external system.

20 Claims, 10 Drawing Sheets

(56) References Cited

U.S. PATENT DOCUMENTS

| | | | |
|---|---|---|---|
| 6,356,868 B1 | 3/2002 | Yuschik et al. | |
| 8,276,816 B2 | 10/2012 | Gardner | |
| 8,702,007 B2 | 4/2014 | Yisraelian et al. | |
| 8,730,009 B2 | 5/2014 | Barry | |
| 8,756,680 B2 | 6/2014 | Shashidhar | |
| 8,775,814 B2 | 7/2014 | Bidare | |
| 8,775,819 B2 | 7/2014 | Hamid et al. | |
| 2002/0178122 A1* | 11/2002 | Maes | G06Q 20/04 705/64 |
| 2003/0046554 A1 | 3/2003 | Leydier et al. | |
| 2004/0019812 A1* | 1/2004 | Chen | G06F 1/263 713/300 |
| 2004/0050930 A1 | 3/2004 | Rowe | |
| 2004/0220791 A1* | 11/2004 | Lamkin | G06F 17/30017 703/11 |
| 2005/0039027 A1 | 2/2005 | Shapiro | |
| 2006/0156385 A1* | 7/2006 | Chiviendacz | G06F 21/36 726/2 |
| 2006/0213972 A1* | 9/2006 | Kelley | G06K 7/0008 235/380 |
| 2007/0220272 A1 | 9/2007 | Campisi et al. | |
| 2008/0117300 A1* | 5/2008 | Shin | H04N 5/23212 348/191 |
| 2008/0129699 A1* | 6/2008 | Cho | H04M 1/0208 345/168 |
| 2008/0173717 A1* | 7/2008 | Antebi | G01S 5/22 235/439 |
| 2009/0023406 A1* | 1/2009 | Ellis | H04B 1/20 455/140 |
| 2009/0152343 A1* | 6/2009 | Carter | G06Q 10/0633 235/379 |
| 2009/0153297 A1 | 6/2009 | Gardner | |
| 2010/0294835 A1 | 11/2010 | Bam et al. | |
| 2011/0018490 A1* | 1/2011 | Furuya | G06K 19/0701 320/101 |
| 2013/0346767 A1* | 12/2013 | Cheng | G06F 1/26 713/310 |
| 2014/0026213 A1 | 1/2014 | Antebi et al. | |
| 2014/0084059 A1 | 3/2014 | Sierchio et al. | |
| 2014/0145513 A1 | 5/2014 | Kapoor et al. | |
| 2014/0175178 A1 | 6/2014 | Yisraelian et al. | |
| 2014/0189813 A1 | 7/2014 | Stollman | |
| 2014/0221069 A1* | 8/2014 | Kessman | A63F 13/00 463/13 |
| 2014/0258109 A1 | 9/2014 | Jiang et al. | |
| 2014/0327922 A1 | 11/2014 | Kamishiro | |

* cited by examiner

US 9,654,470 B2

MULTI-FUNCTION SMART COMMUNICATION CARD

CROSS-REFERENCE

This application is a continuation of, and claims priority to, the United States patent application that was filed on Jul. 14, 2014 with a Ser. No. 14/330,051 (issued as U.S. Pat. No. 9,177,133) and that application is hereby incorporated by reference.

GOVERNMENT INTEREST

The innovation described herein may be manufactured, used, imported, sold, and licensed by or for the Government of the United States of America without the payment of any royalty thereon or therefor.

BACKGROUND

A company can use a computer system to provide various capabilities to their employees. One such capability can be to provide access to computer files such as word processing documents. However, the content of these word processing documents may be sensitive with regard to company operation, client details, etc. Therefore, the company can attempt to limit admission to the word processing documents. One way of limiting admission is through a password system such that a specific word processing document cannot be accessed without entry of a certain password. When the certain password is entered, a user of a computer station can be granted admission with regard to the specific word processing document.

SUMMARY

In one embodiment, a system comprises a smart card and a power component. The power component can be part of the smart card. In addition, the power component can be configured to supply power to the smart card sufficient to power the smart card absent power from an external source.

In one embodiment, a system comprises an input component and an identification component that are both resident on a smart card. The input component is to collect an input while the identification component is to perform an identification of a particular user associated with the smart card from among at least a potential first user or a potential second user that are different from one another. The identification can be based, at least in part, on the input while the particular user can be provided access control to an external structure associated with the smart card after the identification meets a standard.

In one embodiment, a smart card can comprise a power component, an identification component, a first access component, and a second access component. The power component can supply power to the smart card sufficient to power the smart card in absence of power from an external source. The identification component can obtain an identification of a particular user associated with the smart card. The first access component can grant the particular user access to a first secure network that requires a first credential for access in response to the particular user being identified. The second access component can grant the particular user access to a second secure network that requires a second credential for access in response to the particular user being identified. The first secure network and the second secure network can be different from one another while the first credential and the second credential can be separate from one another.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
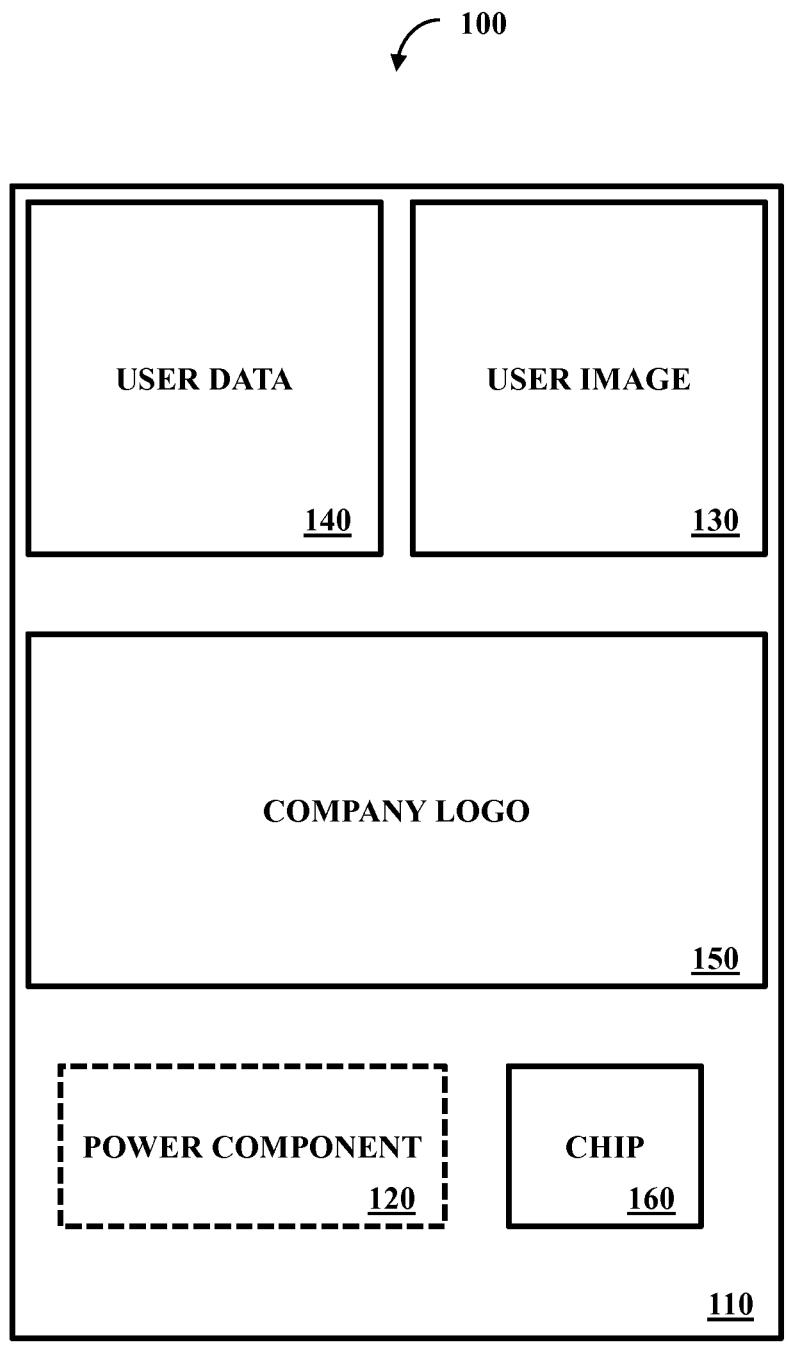
FIG. 1 illustrates one embodiment of a system comprising a smart card, a power component, a user image, user data, a company logo, and a chip.

A smart card can be a user issued device employed to provide access to at least part of a computer system. The smart card is a card with an embedded integrated circuit (e.g., such as a card that is pocket-sized). The embedded integrated circuit may be visible on the outside of the card or within the card and not outwardly visible. A computer device can access a smart card through a variety of manners, such as through use of a slot capable of receiving the smart card, identifying when a smartcard is within vicinity, etc. When the smart card is inserted into the slot the computer device can provide power to the smart card and the smart card can cause a prompt to be displayed upon a display of the computer device. The prompt can ask the user of the smart card for a password that is entered by way of computer device hardware such as a keyboard. If the user enters the correct password, then the user can be given access to at least part of the computer system.

In accordance with aspects disclosed herein, a smart card can have various functions that go beyond providing access for a single user to a computer system. In one example, the smart card can be configured to power itself, such as through use of a smart card battery powered by solar energy obtained from a solar panel of the smart card. In one example, the smart card can be non-user specific such that multiple users can use a single smart card. Access granted by the non-user specific smart card can be to different users and the access provided to these different users can be different based on which user is given access. Therefore, a smart card can be employed with multiple functions.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

FIG. 1 illustrates one embodiment of a system 100 comprising a smart card 110 and a power component 120, a user image 130, user data 140, a company logo 150, and a chip 160. The chip 160 can be an embedded integrated circuit of the smart card 110. Various information can be displayed on the smart card such as the user image 130 (e.g., user picture), the user data 140 (e.g., user name and position title), the company logo (e.g., a trademarked graphic), and other information (e.g., company slogan). While the user image 130, user data 140, and company logo 150 are shown as part of the smart card 110, the smart card 110 may configure without at least one of these (e.g., the smart card is visually white with the exception of chip 160 that is golden).

The power component 120 can be part of the smart card 110. The power component 120 can be configured to supply power to the smart card 110 sufficient to power the smart card 110 in absence of power from an external source. Sufficient to power the smart card 110 can include a level of power to power the smart card 110 for a non-de minimis period of time (e.g., longer than a brief period after exiting a computer where the smart card 110 may still be powered), a level of power to power one or more functions of the smart card 110, etc.

In one embodiment, the smart card 110 is configured to self-power. Various types of self-powering can occur. In one example, the smart card 110 can be configured with a solar panel set (e.g., one or more devices capable of obtaining solar energy). Energy collected by the solar panel set can be immediately used by the smart card 110 and/or be retained in a battery for later usage. In one example, the power component 120 can practice intelligent powering. With this intelligent charging, the power component 120 can check if the smart card 110 is connected to an external source such as a computer system. If the smart card 110 is connected to the external source, then the smart card 110 can attempt to draw power from the external source (e.g., draw power, request power to be drawn, check if power is available, etc.). If the smart card 110 is not connected to the external source, then the power component 120 can use its own power to function if available (e.g., from a battery, capacitor, super capacitor, etc.).

In one embodiment, the smart card 110 is configured to communicate by way of a first platform and a second platform. The smart card 110 can wirelessly communicate with the external system and/or a wired configuration (e.g., by way of the chip 160 interfacing with the external system). Different platforms can be used, such as Bluetooth and Near Field Communication (e.g., Bluetooth is the first platform and Near Field Communication (NFC) is the second platform). Communication with the different platforms can occur concurrently and/or alternatively. In one example the smart card 110 can communicate with a first device by way of Bluetooth and a second device that is different from the first device by way of NFC. In addition, the smart card 110 can receive a NFC signal from a near field communication reader and the power component 120 can use modulation from the reader to condition the NFC signal to provide power to the smart card 110. While aspects disclosed herein address the smart card 110 being a physical card, the smart card 110 can function in other embodiments, such as a smart token (e.g., functioning as a flash drive).

Figure 2:
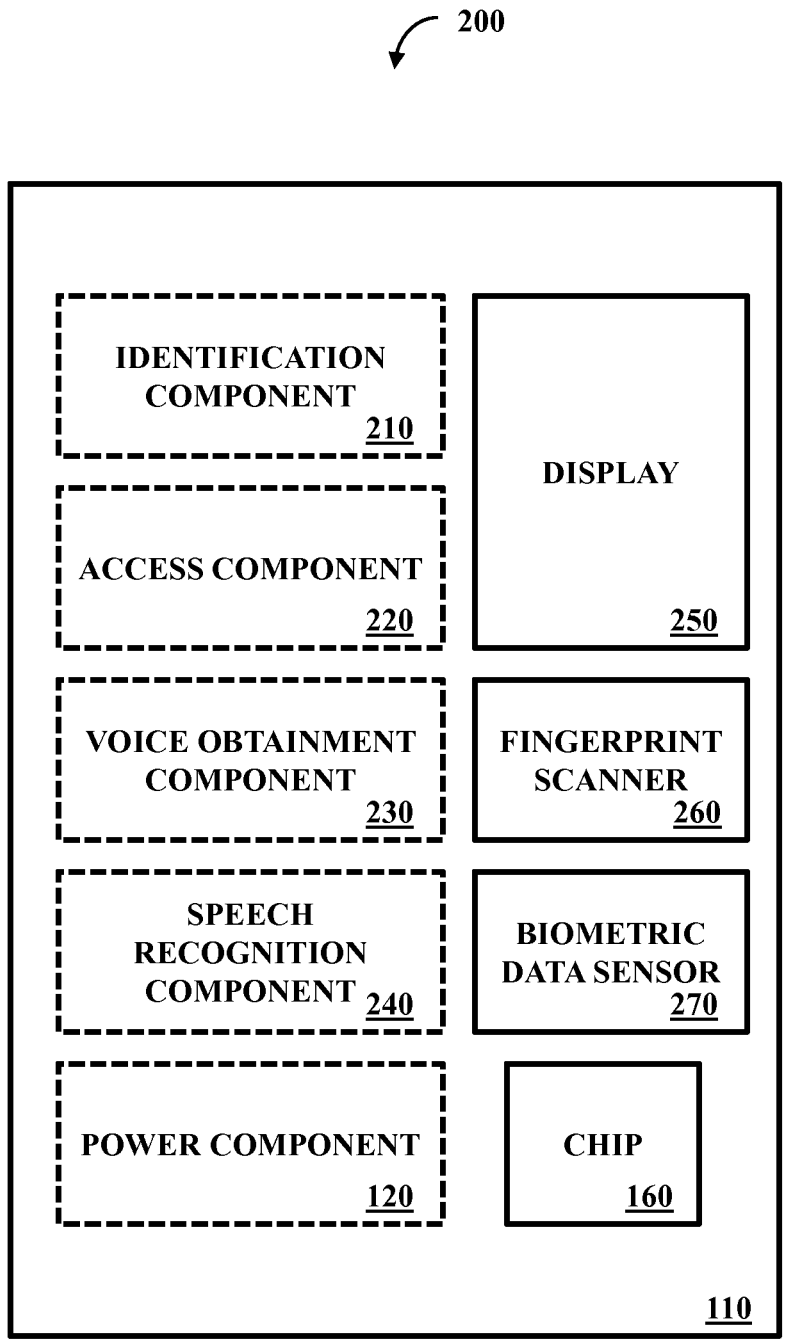
FIG. 2 illustrates one embodiment of a system comprising the smart card, the power component, the chip, an identification component, an access component, a voice obtainment component, a speech recognition component, a display, a fingerprint scanner, and a biometric data sensor.

FIG. 2 illustrates one embodiment of a system 200 comprising the smart card 110, the power component 120, the chip 160, an identification component 210, an access component 220, a voice obtainment component 230, a speech recognition component 240, a display 250, a fingerprint scanner 260, and a biometric data sensor 270. While shown in one card these components and other items can be placed in different configurations (e.g., the smart card 110 functions without the display 250 and with the biometric data sensor 270, the smart card 110 functions with the power component 120 and identification component 210, etc.). Components disclosed herein can be part of the smart card 110 and/or be attached to the smart card 110 (e.g., the fingerprint scanner 260 can attach to the smart card 110 by way of a Universal Serial Bus port of the smart card 110).

The identification component 210 can be configured to perform an identification of a particular user associated with the smart card 110. In one example, the smart card 110 can be associated with a single user (e.g., a computer system assigns the smart card 110 to the single user and the single user's image is on the smart card as user image 130 of FIG. 1). In one example, the smart card 110 can be associated with multiple users (e.g., the smart card 110 is configured to be used by two different users, the smart card 110 is configured to be operated by a user that provides a password, etc.). When the smart card 110 is associated with multiple users, the smart card 110 can be configured to differentiate different users among the multiple users such that the smart card 110 operates in a specific manner for a particular user. The particular user can be provided access control to the smart card 110 (e.g., the smart card 110 itself, a computer network to which the smart card 110 engages, etc.) after the identification meets a standard (e.g., the user is on an approved user list, the user provides a correct password, etc.).

The smart card 110 can employ various features and/or hardware to assist the identification component 210 in performing the identification. One example piece of hardware can be a fingerprint scanner 260 (e.g., thumbprint scanner, palm print scanner, etc.). The fingerprint scanner 260 can be configured to obtain a fingerprint scan of the particular user. The identification component 210 performs the identification through use of the fingerprint scan. In one example, the particular user can place their thumb on the fingerprint scanner 260. The fingerprint scanner 260 scans their thumbprint and the identification component 210 compares the thumbprint with a list of authorized thumbprints (e.g., the list is retained on the smart card 110, the list is retained at a remote location, etc.). If the thumbprint successfully matches an authorized thumbprint, then access can be granted to the particular user while otherwise the identification component 210 can provide a denial.

Another aspect that can be employed is the voice obtainment component 230. The voice obtainment component 230 can be configured to obtain a voice and the identification component 210 performs the identification through use of the voice. In one example, the voice obtainment component 230 can comprise a microphone and a module to convert what is recorded by the microphone into an electronic record. For example, the particular user can speak into the microphone and an electronic record can be made. This speech can be specific terms (e.g., how the user states a keyword) or general terms (e.g., focus on the user's voice). The electronic record can be compared with a known voice record to determine if the speaker is authorized to use the smart card 110. If the comparison results in a successful match, then access can be granted to the particular user, otherwise a rejection can be provided.

In one embodiment, the biometric data sensor 270 can be configured to obtain biometric data of the particular user. The identification from the identification component 210 can be performed through use of the biometric data (e.g., face recognition, DNA, hand geometry, iris recognition, scent, etc.). Similar to what is discussed above, a comparison can be made with known data of the particular user and based on a result access can be granted or denied.

In one embodiment, multiple verifications for identification can occur. The smart card 110 can employ a first identification component and a second identification component (e.g., two separate and distinct components, a single component functioning with multiple roles, etc.). The first identification component can be configured to perform a first identification of the particular user associated with the smart card by way of a first identification manner (e.g., through use of the fingerprint scanner 260). The second identification component can be configured to perform a second identification of the particular user associated with the smart card by way of a second identification manner (e.g., through use of the voice obtainment component 230) different from the first identification manner.

Depending on the manner of identification used, different access control can be given. In one example, a computer system can have two classifications of documents: sensitive (e.g., client lists) and non-sensitive (e.g., paid holiday list). Fingerprint-based identification can be considered a more secure form of identification than voice-based identification. Therefore, when fingerprint-based identification occurs, a first level of access control can be provided by way of the smart card 110 (e.g., access to the sensitive and non-sensitive documents). However, when voice-based identification occurs, a second level of access control can be provided by way of the smart card 110 (e.g., access to the non-sensitive documents, but not to the sensitive documents). Thus, the first level of access control can be distinct from the second level of access control. In one embodiment, before access control is given with regard to the smart card 110 (e.g., to the smart card 110 itself, to a system with which the smart card 110 engages, etc.) two manners of identification are required (e.g., voice-based identification and fingerprint-based identification).

In one embodiment, the smart card 110 can be loaded with multiple credentials. An individual credential can be associated with a particular user. When the identification is that the particular user is a first user associated with a first credential retained by the smart card 110, then the first credential is used for access control. Similarly, when the identification is that the particular user is a second user that is different from the first user and is associated with a second credential retained by the smart card 110, then the second credential that is different from the first credential is used for access control. Different credentials with different access levels can be loaded onto the smart card 110. In addition to being user specific, the different credentials can have different access control (e.g., different levels to one system, access control to different systems, etc.). When a particular user provides identification information (e.g., has their fingerprint scanned) the identification component 210 can identify the user and prompt the credential associated with that user to be activated. In one example, the particular user can enter the smart card 110 into a computer configuration (e.g., laptop computer, computer network, mobile device, etc.) to access the computer configuration. The identification component 210 can identify the user and provide the user the appropriate credential (e.g., the first credential). The first credential can enable a first level of access (e.g., for the first user) while the second credential can enable the second user a second level of access (e.g., for the second user) that is distinct from the first level of access. In one embodiment, the first credential and the second credential can be used concurrently or usage can be restricted to single credential usage at one time.

In one embodiment, the access control to the smart card 110 (e.g., access to data retained on the smart card 110 and ability to control function and/or use of the smart card 110) is configured to be provided prior to the smart card 110 engaging with an external structure and/or after the smart card 110 engaging with the external system. In one example, the particular user can place her thumb on the fingerprint scanner 260. After being identified, she can place the smart card 110 into a keyboard with a smart card receiver (e.g., the smart card 110 is inserted into the smart card receiver, the smart card 110 engages with the smart card receiver wirelessly, etc.). Once the smart card 110 is engaged with the smart card receiver the particular user can have access control to the external system (e.g., a computer, a server, a personal electronic device, a network). Thus, access control to the smart card 110 can facilitate access control to the external structure when the smart card 110 engages with the external structure (e.g., engages with the smart card receiver).

The smart card 110 can comprise the display 250, which can perform various functions. The display 250 can provide instructions to a user on how to gain access control to the smart card 110 and/or a system with which the smart card 110 engages. Various components can use the display 250 and/or function in conjunction with the display 250. In one example, the identification component 210 can use the display 250 in accordance with performance of the identification. The identification component 210 can be configured to perform an identification of a candidate user (e.g., the particular user) associated with the smart card 110. The candidate user can be provided access control to the smart card 110 after the identification is successful. The identification can be performed through use of information supplied by the candidate user by way of entrance of a swipe pattern upon the smart card 110 (e.g., upon the display 250). Thus, the candidate user may not be previously known by the smart card 110, but merely able to supply entry information. In one example, a set of icons can appear on the display 250 and when the particular user engages one or more of the icons in a set pattern the particular user is given access control (e.g., access) to the smart card 110 and/or external structure. Multiple components and/or other items can combine together, such as the display 250 functioning as the fingerprint scanner 260. The display 250 can display data from the smart card 110, the external system, etc.

In one embodiment, the access component 220 can be configured to grant the particular user access to a first secure network that requires a first credential for access and simultaneously grant the particular user access to a second secure network (that is different from the first secure network) that requires a second credential (that is different from the first credential) for access. The smart card 110 can store in memory a plurality of credentials. The credentials can be specific to a user and/or specific to a network. Thus, the smart card 110 can retain and function with a first credential for a first user used to access a first network and a second credential for a second user to access a second network.

In one embodiment, the smart card 110 can function with the speech recognition component 240 that is configured to recognize a speech of a speaker (e.g., the particular user). The smart card 110 can facilitate use of the speech and/or raw speech data can be collected by the speech recognition component 240 and actual speech recognition occurs elsewhere form the smart card 110. In one example, the particular user can speak a command that is captured and processed by the speech recognition component 240 and then followed by the smart card 110. The command could be 'connect with network ABC123.' In one example, the speech recognition component 240 can function such that as the particular user speaks the speech is recorded as text and shown on the display 250. Received audio can be digitized and sent to a speech recognition algorithm of the speech recognition component 240. After being processed speech information can be sent to a text algorithm of the display 250 where text is displayed. Speech can also be translated by the speech recognition component 240 (e.g., speech spoken and received in English can be translated and presented on the display 250 in Spanish). The smart card 110 can be configured such that speech is not recognized until access control is provided (e.g., an authorized user is identified) and/or speech recognition is limited to the speech of the authorized user.

Figure 3:
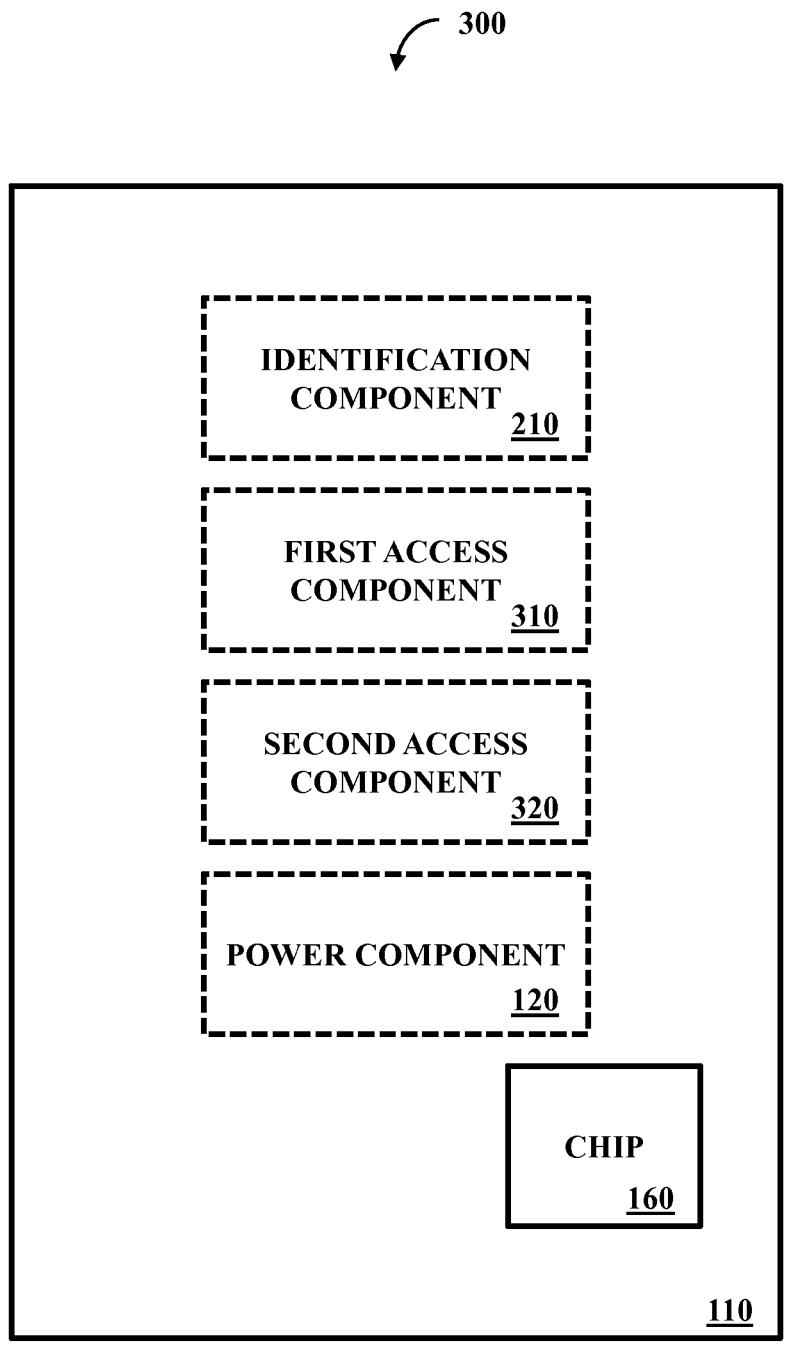
FIG. 3 illustrates one embodiment of a system comprising the smart card, the power component, the chip, the identification component, a first access component, and a second access component.

FIG. 3 illustrates one embodiment of a system 300 comprising the smart card 110, the power component 120, the chip 160, the identification component 210, a first access component 310, and a second access component 320 (e.g., the first access component 310 and the second access component 320 are the access component 220 of FIG. 2). The power component 120 can supply power to the smart card 110 that is sufficient to power the smart card 110 in absence of power from an external source. This powering can be to keep minimal functionality of the smart card 110 for a period of time, full functionality of the smart card 110 for the period of time, etc. The power component 120 can self-charge, such as receive solar energy and retain that solar energy in a battery of the smart card 110.

The identification component 210 can obtain an identification of a particular user associated with the smart card 110. In one embodiment, obtainment of the identification occurs through a first obtainment by way of a first identification manner and a second obtainment by way of a second identification manner. In one example, the first obtainment manner can be voice recognition and the second obtainment manner can be through entering a password and as such the manners can be different from one another. Different configurations can apply, such as when one of the two manners being successful indicates successful identification and after identification access control can be provided to the particular user. In one configuration, identification is obtained when a result of the first obtainment matches with a result of the second obtainment (e.g., both manners successfully identify the particular user) and thus access control can be limited until both manners are successful. In one example, a candidate provides a swipe pattern on the display 250 of FIG. 2. If the candidate is successful, then the display 250 of FIG. 2 converts into a fingerprint scanner 260 of FIG. 2 and the candidate supplies a fingerprint. Thus one manner (e.g., fingerprint scanning) occurs after successful completion of another manner (e.g., the swipe pattern).

The first access component 310 can grant the particular user access to a first secure network that requires a first credential for access in response to the particular user being identified. Similarly, the second access component 320 can grant the particular user access to a second secure network (that is different from the first network) that requires a second credential (that is different from the first credential) for access in response to the particular user being identified. Therefore, the smart card 110 can function with multiple credentials (e.g., that apply to different users or are for the same user) and well as function with different secure networks (e.g., two networks that are from the same company, two networks of different companies, etc.).

In one embodiment, the smart card 110 communicates by way of a first platform to a first external system (e.g., first laptop computer, first network, etc.) and a second platform to a second external system different from the first external system (e.g., second laptop, second personal electronic device, etc.). The communication can include access control. The communication can occur concurrently and/or be restricted to single usage.

Figure 4:
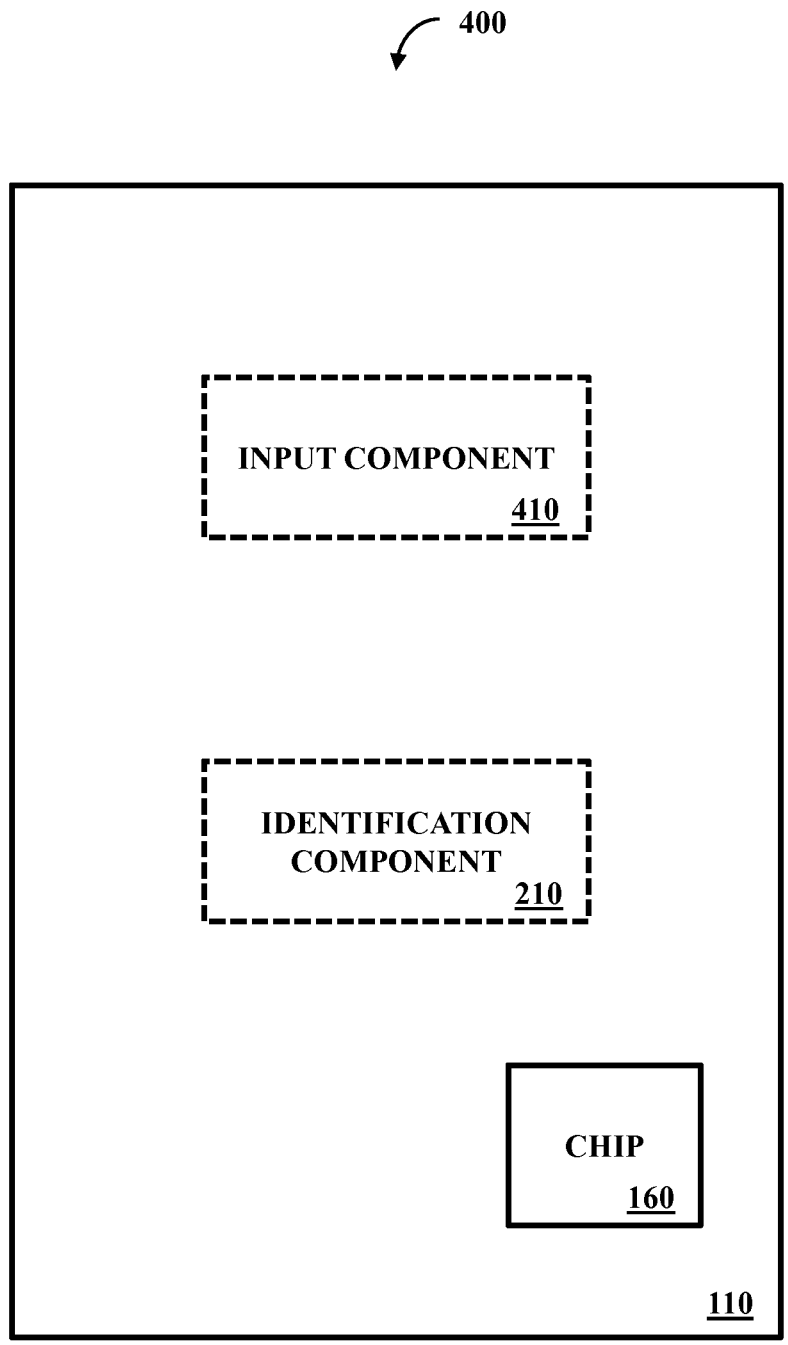
FIG. 4 illustrates one embodiment of a system comprising the smart card, the chip, an input component, and the identification component.

FIG. 4 illustrates one embodiment of a system 400 comprising the smart card 110, the chip 160, an input component 410, and the identification component 210. The input component 410 can collect an input. Example inputs can include a fingerprint scan, a voice recording retained from a user's speech, a password, a swipe pattern, etc. The identification component 210 can perform an identification of a particular user associated with the smart card 110 from among at least a potential first user or a potential second user that are different users, where the identification is based, at least in part, on the input. After the identification meets a standard (e.g., the particular user is identified with a certain level of confidence) the particular user can be provided access control to an external structure associated with the smart card 110.

In one example, a set of three shift workers (e.g., 8 AM-4 PM, 4 PM-12 AM, and 12 AM to 8 AM) can share one smart card 110. The smart card 110 can be used to access a piece of manufacturing machinery used by the shift workers during their respective shifts. The individual shift workers can input identifier information and from this identifier information the identification component 210 can identify which user is using the smart card 110 and in turn the machinery. Information pertaining to individual performance of the shift worker, such as efficiency and proper machine usage, can be monitored through use of the smart card 110. In one example, the smart card can remain with the machinery and when workers change shifts the old worker can log out and/or the new worker can log in (e.g., be identified and be given access control to the machinery). In one example, a shift worker can keep a smart card 110 in his pocket after being identified. Access control can be provided to different machines when the shift work is within a close enough physical proximity for the smart card 110 to communicate with the particular machine and as such facilitate access control for the particular machine.

In one embodiment, the smart card 110 comprising the power component 120 of FIG. 1. Thus, the smart card 110 can power itself, such as through use of a solar panel (e.g., panel that obtains power from a solar source, such as the sun or artificial lighting). The power component 120 can have a connector to be charged by way of an electrical outlet and/or through use of a replaceable battery. The power component 120 can provide power sufficient to power the smart card 110 in absence of power from an external source, where the power component obtains the supplied power from a solar source.

Figure 5:
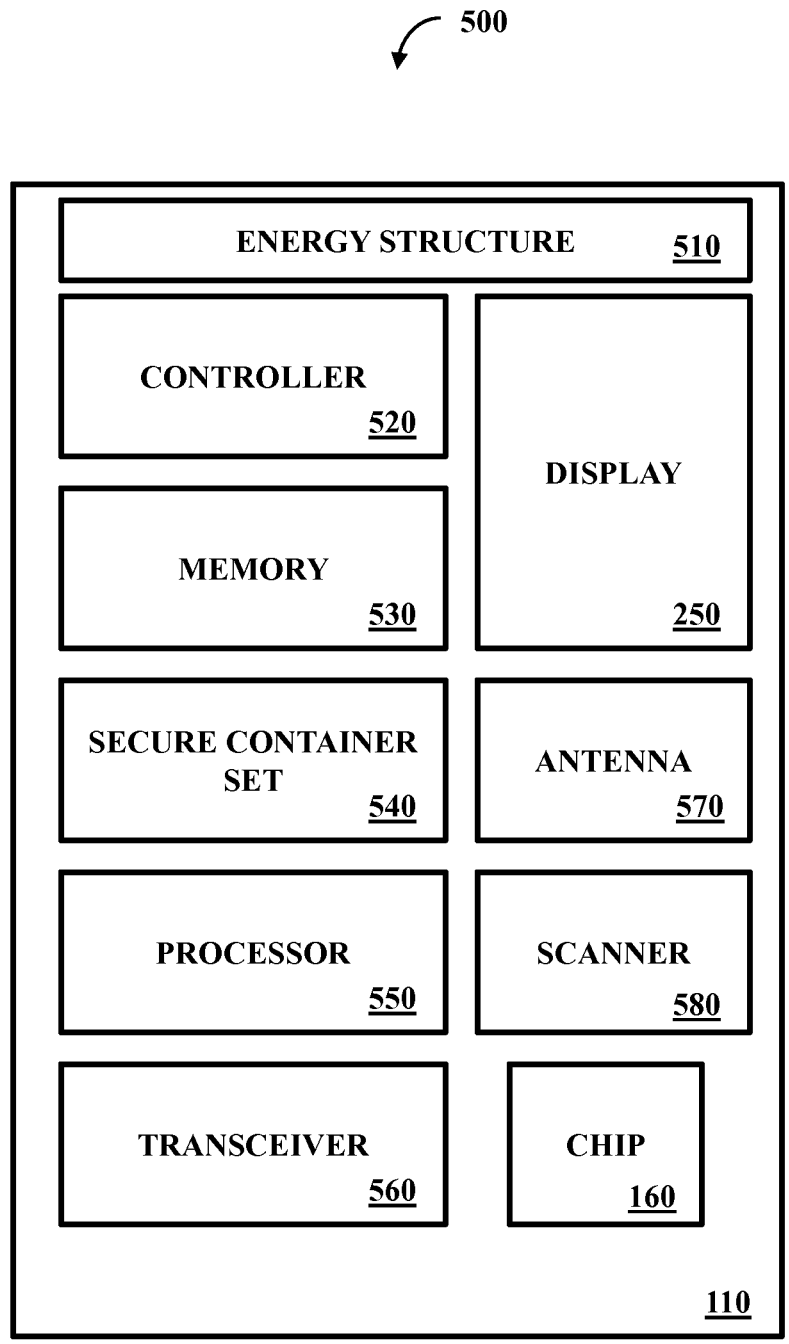
FIG. 5 illustrates one embodiment of a system comprising the smart card, the chip, the display, an energy structure, a controller, a memory, a secure container set, a processor, a transceiver, an antenna, and a scanner.

FIG. 5 illustrates one embodiment of a system 500 comprising the smart card 110, the chip 160, the display 250, an energy structure 510, a controller 520, a memory 530, a secure container set 540, a processor 550, a transceiver 560, an antenna 570, and a scanner 580. The smart card 110 can be configured into a number of layers, such as a solar panel layer, a battery layer, and electronics layer, and a surface layer. The solar panel layer can be an outer layer that is part of the energy structure 510 (e.g., the energy structure 510, the solar layer, the battery layer, the electronics layer, or a combination thereof can be part of the power component 120 of FIG. 1). The solar panel layer can convert solar energy into electrical energy that charges the battery layer and/or powers the electronics layer. The battery layer can be a thin battery capable of being recharged and driving electronics of the smart card 110. The energy structure 510 can comprise contacts (e.g., that are part of the outer layer) configured to connect to an external energy source that powers the electronics layer and/or charges the battery layer. In one example, the battery has a high enough output voltage and current to drive the electronics layer or that can be increased in order to drive the electronics layer. In one example, the electronics layer comprises components disclosed herein, the transceiver 560, the antenna 570, the controller 520, the memory 530, and the secure container set 540, and the processor 550. In one example, the outer layer comprises the contacts to charge the battery layer, the display 250, and the scanner 580. The outer layer can be pressure sensitive and/or be a capacitive material.

In one example, the pressure sensitive nature of the outer layer can facilitate when fingerprint scanning occurs with regard to identification (e.g., the entire outer layer is the display 250 that can function as the scanner 580). The memory 530 (e.g., random access memory, non-volatile memory, etc.) can retain encrypted information such as a fingerprint database for allowable users of the smart card 110. In one example, the secure container set 540 is part of the memory 530 and individual authorized users have individual containers with person information (e.g., fingerprint information, biometric information, password information, etc.). The memory 530 can securely store data and work in conjunction with various other parts of the smart card 110. In one example, the biometric data sensor 270 of FIG. 2 can be used to acquire biometric data that becomes part of a biometric database (e.g., stored in the memory 530, stored off the smart card 110, etc.). The smart card 110 can employ the memory 530 in functioning as an access control storage device (e.g., rule and/or role based) for storing and/or retrieving data.

While shown as part of the smart card 110, the secure container set 540 can be located remotely from the smart card 110. The secure container set 540 can be one or more containers that retain sensitive information. In one example, a military tank crew can comprise four members. One smart card 110 can be used for the tank where the smart card 110 has four secure containers—one for each crew member. The secure containers can include identifying credentials, access credentials, medical history, etc. In one example, a tank crew member can suffer from a disease that is considered private information. The secure container for that member can retain disease information and access for the secure container medical information can be restricted such that access is limited to personnel that have their own smart card communicate with the smart card 110 (e.g., wirelessly) that identifies the requestor as medical personnel.

The scanner 580 can scan a fingerprint of a potential user. The processor 550 can facilitate communication with an external database for comparison of the fingerprint scan with known fingerprints to determine if the fingerprint is recognizable (e.g., comparison occurs on the smart card 110 or at another location such that the fingerprint scan is sent to a computer system). The processor 550 can attempt to compare with what is retained on the smart card 110 and if not, then a second comparison can be made where presumably more fingerprints may be available (e.g., when an off-card comparison is successful, the compared print is retained on the smart card 110).

Figure 6:
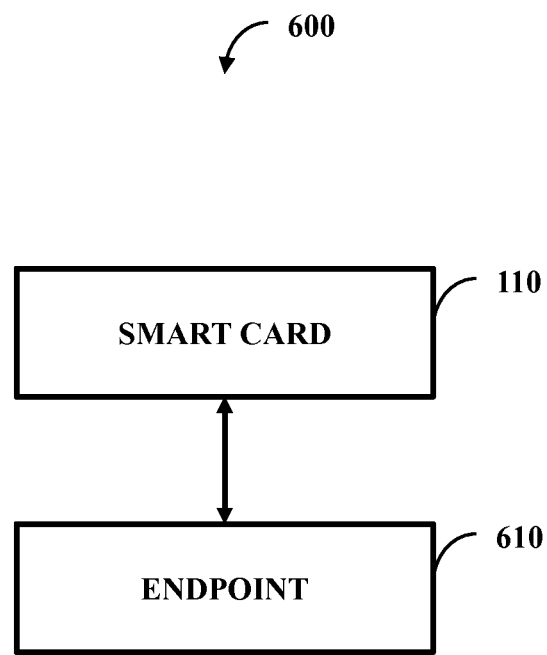
FIG. 6 illustrates one embodiment of a system comprising the smart card and an endpoint.

FIG. 6 illustrates one embodiment of a system 600 comprising the smart card 110 and an endpoint 610. The endpoint 610 can be a computer, a personal electronic device, a network, etc. The smart card 110 (e.g., functioning as a secure container for encrypted keys, functioning as a root of trust, short range communication device, protocol gateway, firewall, military type identification tag (commonly known as 'dog tag'), etc.) can communicate with the endpoint 610 (e.g., securely transmit a credential) in a hard-wired manner and/or in a wireless manner (e.g., secure communication by way of Blue Tooth and/or NFC).

When identification of a user is successful (e.g., a candidate user is determined to be authorized to use the smart card 110 and/or the external system) the smart card 110 can set up a secure tunnel with the endpoint 610 (e.g., the tunnel can be established by one or more communication platforms, such a Bluetooth). The endpoint 610 can exchange credentials with the smart card and cause the smart card 110 to be unlocked. If identification is not successful the candidate user can be asked to perform another attempt. After a predetermined number of unsuccessfully authentications, the smart card 110 can tamper or be locked such that administrative login can used to reset the smart card 110.

In one embodiment, the smart card 110 has minimal functionality and function to obtain information used in identification where the actual identification occurs at the endpoint 610. In one example, the smart card 110 and the endpoint 610 have a pre-identification secure tunnel established. The display 250 of FIG. 2 can receive a swipe pattern. The smart card 110 then encrypts a digitized version of the received swipe pattern and sends the digitized pattern to the endpoint 610. The endpoint 610 can identify the user and once successfully identified the endpoint can be unlocked for use by the candidate user.

In one embodiment, identification functionality can be split between the smart card 110 and the endpoint 610. A user can unlock the smart card 110 with a swipe patter and once the smart card is unlocked the secure tunnel can be established between the smart card 110 and the endpoint 610 (e.g., established using NFC, Bluetooth, or a combination thereof). In one example, two matches can be used to provide a candidate user access control to the smart card 110 and/or the endpoint 610 (e.g., the endpoint 610 being an external structure). The smart card 110 can scan a user's fingerprint and compare it with a local database. If the comparison is not successful, then an error message can be generated and displayed on the smart card 110. If the comparison is successful (e.g., the user is identified), then the fingerprint can be sent to the endpoint 610 for another comparison. If the endpoint comparison is not successful, then the smart card can generate and display the error message. If the endpoint comparison is successful, then the smart card 110 can grant access control (e.g., access control to a physical location, access control to a data storage location, etc.).

In one embodiment, the smart card 110 is used to engage with a remote network. When user identification is successful, the smart card 110 can unlock the endpoint 610 and then the endpoint 610 and/or the smart card 110 can negotiate with the secure network to establish at least one secure tunnel. In one example, the user can initiate establishment of the at least one secure tunnel by way of the smart card 110 and/or the endpoint 610. Credentials can be encrypted and passed, in one example, between the smart card 110 and the endpoint 610 and then the endpoint 610 and the remote network. The secure network can request a user credential (e.g., login and password, certificate, biometric data obtained by the biometric data sensor 270 of FIG. 1, security token, physical switch of the smart card 110, capacitive touch combination, etc.) in order to establish the secure tunnel. In one example, re-identification can occur (e.g., periodically), such as re-identification requested by the remote network, where continued access control to the smart card 110, the endpoint 610, the remote network, or a combination thereof can be cancelled if re-identification is not successful.

An example network to which access control can be granted by way of the smart card 110 can include a device set to grant or deny access based on a credential. Architecture of the network can comprise access points that communicate with a central database to verify credentials and/or manage permissions (e.g., through use of strong encryption algorithms). The smart card 110 can be moved to within a communication distance of an access point. When within the communication distance of the access point the smart card 110 can receive a query for a credential. When the smart card 110 is activated (e.g., after identification) the credential can be sent in response to the query. Once the credential is received and/or validated access can be provided to the network.

The smart card 110 and the network (e.g., that includes the endpoint 610) can communicate with one another once access control is provided to a user of the smart card 110, such as the smart card 110 providing location information to the network. In this, the network can track the physical movements of the particular user (e.g., in an emergency situation, location of the particular user can be quickly found). If the particular user enters a restricted area to which she does not have access (e.g., tracked through the smart card 110 in her pocket), then a notification can be presented such as on the display 250 of FIG. 2, through a wall loudspeaker, on a door display, etc. Thus, the smart card 110 can be used as an access control device for entering and/or exiting facilities.

Figure 7:
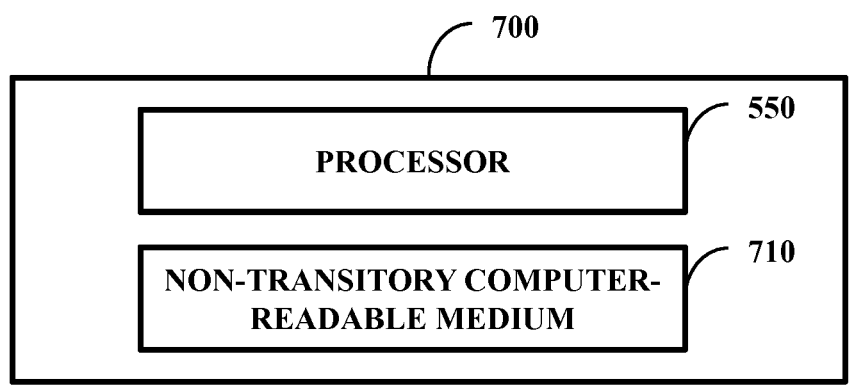
FIG. 7 illustrates one embodiment of a system comprising the processor and a non-transitory computer-readable medium.

FIG. 7 illustrates one embodiment of a system 700 comprising the processor 550 and a non-transitory computer-readable medium 710. In one embodiment the non-transitory computer-readable medium 710 is communicatively coupled to the processor 550 and stores a command set executable by the processor 550 to facilitate operation of at least one component disclosed herein (e.g., the power component 120 of FIG. 1). In one embodiment, the chip 160 of FIG. 1 is the processor 550 and thus the processor 550 functions as an integrated circuit. In one embodiment, at least one component disclosed herein (e.g., the input component 410 of FIG. 4) can be implemented, at least in part, by way of non-software, such as implemented as hardware by way of the system 700. In one embodiment the non-transitory computer-readable medium 710 is configured to store processor-executable instructions that when executed by the processor 550 cause the processor 550 to perform a method disclosed herein (e.g., at least part of one of the methods 800-1000 discussed below).

Figure 8:
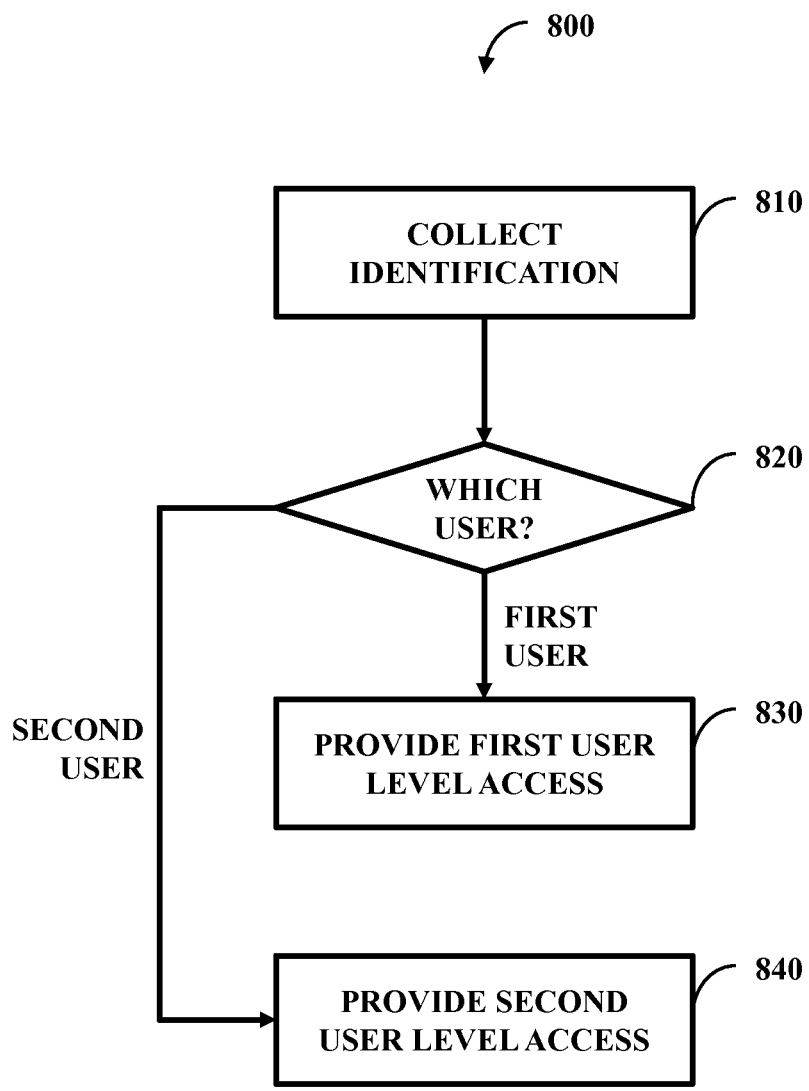
FIG. 8 illustrates one embodiment of a method comprising four actions.

FIG. 8 illustrates one embodiment of a method 800 comprising four actions 810-840. Identification can be collected at 810 and at 820 a determination can be made on a user that is identified. Different users can be provided different levels of access control with regard to the smart card 110 of FIG. 1. The different levels can be user specific or be tiers to which a user belongs. At 830 a first user level access can be provided to a first user when the determination 820 is that the first user is identified. At 840 a second user level access can be provided to a second user that is different from the first user when the determination 820 is that the second user is identified.

Figure 9:
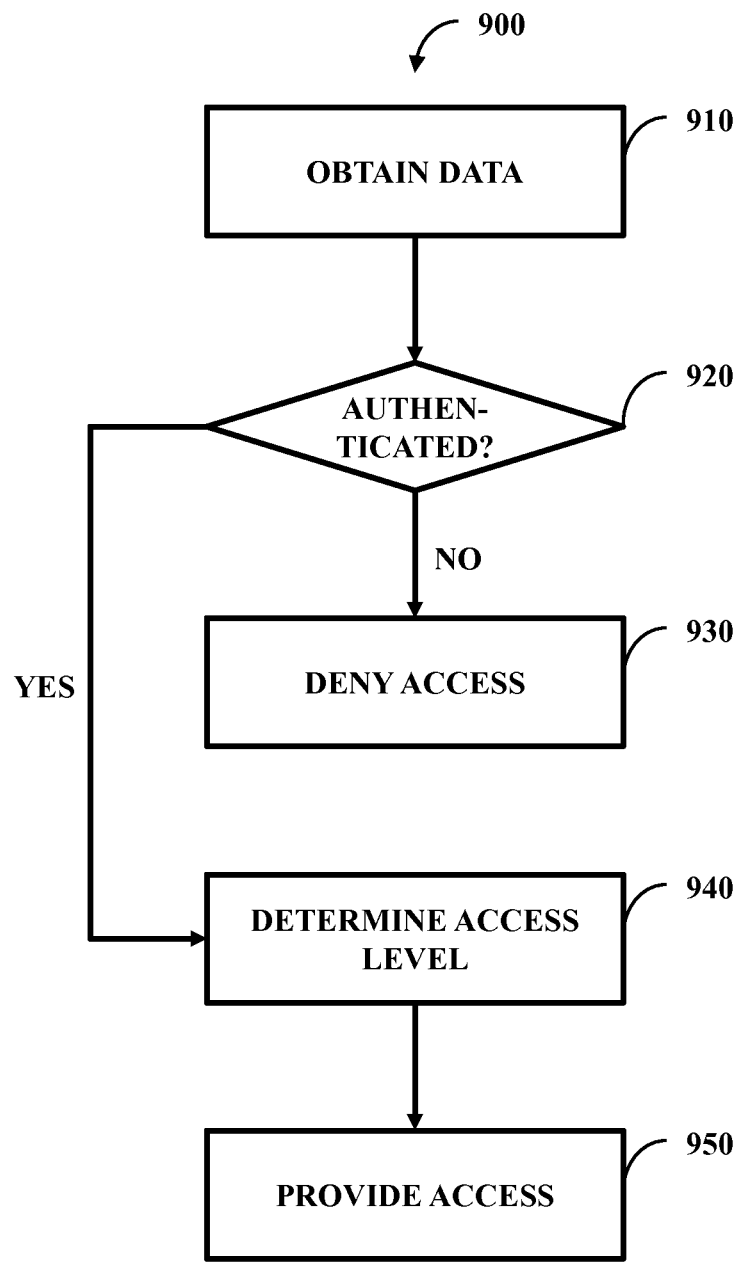
FIG. 9 illustrates one embodiment of a method comprising five actions.

FIG. 9 illustrates one embodiment of a method 900 comprising five actions 910-950. At 910 data can be obtained. In one example, the data obtained is raw data pertaining to an identification of a potential user of the smart card 110 of FIG. 1. At 920 a check can be performed on if a user can be authenticated. Authentication can include identifying the user and determining if the user can be given access based on such identification (e.g., a former employee can be successfully identified, but not have any access level and thus be denied access). If the potential user cannot be successfully authenticated then access control can be denied at 930. If the potential user is authenticated, then a determination of her access level can be made at 940 and provided to her at 950. The determined access level can be based on reading a stored access level or determining the access level in real time.

In one example, a working level employee can be given access to a first secure container of the secure container set 540 of FIG. 5 while a management level employee can be given access to the first secure container and a second secure container of the secure container set 540 of FIG. 5. An employee can provide identification information at 910 and at 920 a determination can be made whether the employee is authorized and if so, then what level of access the employee should reach. At 920 a determination can be made that the working level employee is attempting to gain access control. Based on this determination at 940 the working level employee access can be granted and as such the employee can have access to the first secure container, but not the second secure container.

Figure 10:
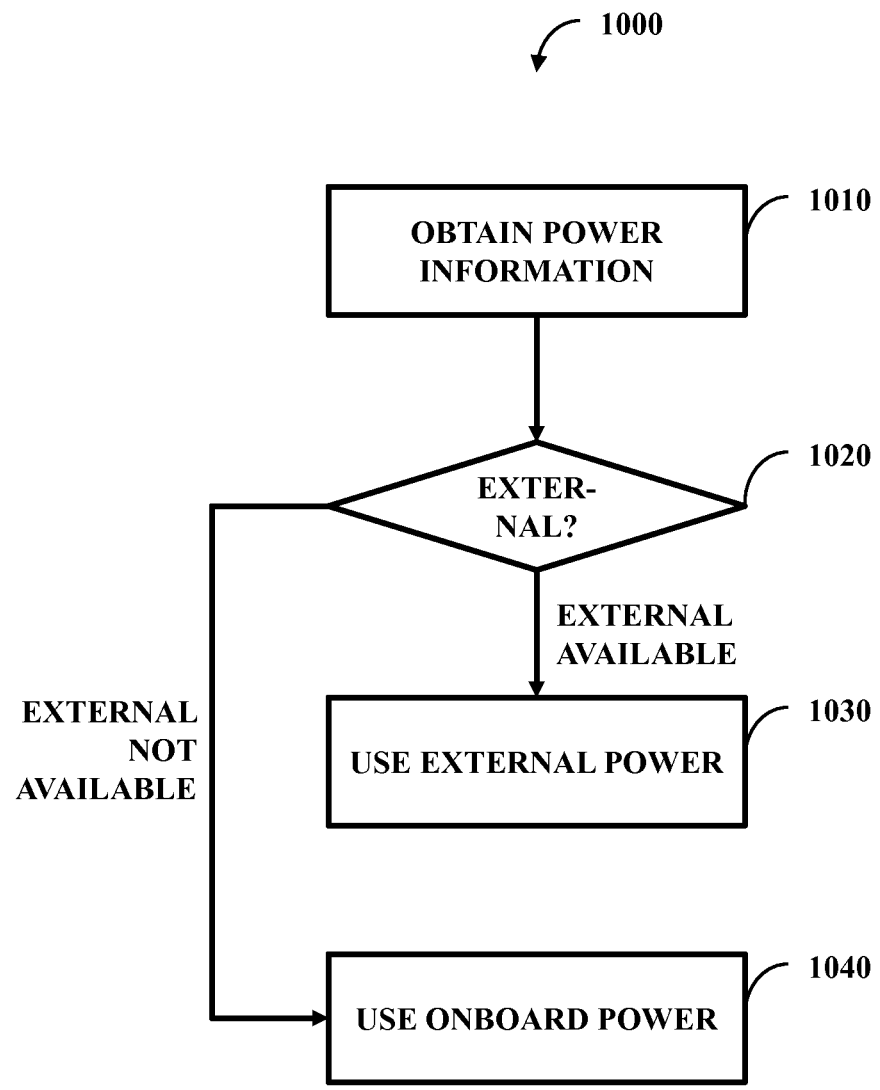
FIG. 10 illustrates one embodiment of a method comprising four actions.

FIG. 10 illustrates one embodiment of a method 1000 comprising four actions 1010-1040. The method 1000 can be an example of how the power component 120 of FIG. 1 can operate. Power information can be obtained at 1010 and a check can occur at 1020 on if an external power source is available (e.g., electric outlet source, inductive source, etc.), where the check is based, at least in part, on the power information. If the external power source is available, then that source can be used at 1030. An example external power source can be a battery of a device with which the smart card 110 of FIG. 1 engages. If the external power source is not available, then power from onboard the smart card 110 of FIG. 1 can be used if available. In one embodiment, the external power source can be solar energy. In one example, if solar energy is available, then the solar energy is used and if not energy from a smart card battery is used. Thus, use of the smart card battery can be limited to when other powering options are not available.

What is claimed is:

1. A system, comprising:
   a smart card; and
   a power component, that is part of the smart card, configured to supply a power to the smart card from a power supply that is part of the smart card sufficient to power the smart card absent a power from an external source,
   where the power component is configured to make a determination on if the power from the external source can be accessed,
   where the power component is configured to supply power to the smart card from the smart card when the determination is that the power from the external source is not able to be accessed, and
   where the determination on if the power from the external source can be accessed is based, at least in part, on a response of the external source to a request from the power component for the power from the external source.

2. The system of claim 1, where the power supply is, at least in part, internal to the smart card.

3. The system of claim 1, where the power supply is, at least in part, external to the smart card.

4. The system of claim 1, where the power component is configured to supply power to the smart card with the power from the external source when the determination is that the power from the external source is able to be accessed.

5. The system of claim 1, where the determination on if the power from the external source can be accessed is based, at least in part, on an availability of the power from the external source.

6. The system of claim 1, where the determination on if the power from the external source can be accessed is based, at least in part, on if the smart card is connected to the external source.

7. The system of claim 1, where the power to the smart card from the power supply is at a level of power sufficient to power one or more functions of the smart card.

8. The system of claim 1, where the power to the smart card from the power supply is at a level of power to power the smart card for a non-de minimis period of time.

9. The system of claim 1, comprising:
   a speech recognition component, that is part of the smart card, configured to recognize a speech of a speaker, where the smart card facilitates use of the speech.

10. The system of claim 9, comprising:
    an identification component, that is part of the smart card, configured to perform an identification of a particular user associated with the smart card,
    where the particular user is provided access control to the smart card after the identification meets a standard,
    where the speech of the speaker is speech of the particular user, and
    where the smart card facilitates use of the speech after the particular user is provided access control.

11. The system of claim 1, comprising:
    an identification component, that is part of the smart card, configured to perform an identification of a particular user associated with the smart card,
    where the particular user is provided access control to the smart card after the identification meets a standard and
    where the access control to the smart card is configured to be provided prior to the smart card engaging with an external structure.

12. The system of claim 1, comprising
    a first power supply that is part of the power supply;
    a second power supply that is part of the power supply;
    a selection component to choose a power supply from which to power the smart card, the chosen power supply comprising the first power supply, the second power supply, or a combination thereof.

13. The system of claim 1, comprising
    a first power supply that is part of the power supply;
    a second power supply that is part of the power supply; and
    a determination component configured to make a determination if a power is available from the first power supply,
    where the power component supplies the power from the first power supply when the determination is that the power is available from the first power supply and
    where the power component supplies a power from the second power supply when the determination is that the power is not available from the first power supply.

14. The system of claim 1, comprising:
    an access component, that is part of the smart card, configured to grant a user access to a first secure network that requires a first credential for access and grant the user access to a second secure network that requires a second credential for access,
    where the first credential and second credential are different credentials, and where the first secure network and the second secure network are different networks.

15. A system, comprising:

a smart card; and a power component, that is part of the smart card, configured to supply a power to the smart card from a power supply that is part of the smart card sufficient to power the smart card absent a power from an external source;

an input component, that is part of the smart card, configured to collect an input; and an identification component, that is part of the smart card, configured to perform an identification of a particular user associated with the smart card from among at least a potential first user or a potential second user, where the power component is configured to make a determination on if the power from the external source can be accessed, where the power component is configured to supply power to the smart card from the smart card when the determination is that the power from the external source is not able to be accessed, where the identification is based, at least in part, on the input, where when the particular user is identified as the potential first user, then the particular user is provided access control to a first external structure associated with the smart card after the identification meets a first standard, where when the particular user is identified as the potential second user, then the particular user is provided access control to a second external structure associated with the smart card after the identification meets a second standard, and where the first external structure and the second external structure are different external structures, and where the potential first user is different from the potential second user.

16. The system of claim 15, where the first standard and the second standard are the same standard.

17. The system of claim 15, where the first standard and the second standard are different standards.

18. A system, comprising:

a smart card; and a power component, that is part of the smart card, configured to supply a power to the smart card from a power supply that is part of the smart card sufficient to power the smart card absent a power from an external source;

an input component, that is part of the smart card, configured to collect an input; and an identification component, that is part of the smart card, configured to perform an identification of a particular user associated with the smart card from among at least a potential first user or a potential second user, where the power component is configured to make a determination on if the power from the external source can be accessed, where the power component is configured to supply power to the smart card from the smart card when the determination is that the power from the external source is not able to be accessed, where the identification is based, at least in part, on the input, where when the particular user is identified as the potential first user, then the particular user is provided a first level of access control to an external structure associated with the smart card after the identification meets a first standard, where when the particular user is identified as the potential second user, then the particular user is provided a second level of access control to the external structure associated with the smart card after the identification meets a second standard, and where the first level of access control and the second level of access control are different hierarchical levels of access control, and where the potential first user is different from the potential second user.

19. The system of claim 18, where the first standard and the second standard are the same standard.

20. The system of claim 18, where the first standard and the second standard are different standards.

* * * * *